2,768,172
Patented Oct. 23, 1956

2,768,172

BROWN VAT DYESTUFFS

Wilhelm Schmidt-Nickels, Little York, N. J., assignor to General Aniline & Film Corporation, New York, N. Y., a corporation of Delaware No Drawing. Application October 25, 1954,
Serial No. 464,620

12 Claims. (Cl. 260—315)

This invention relates to novel brown vat dyestuffs having the formula

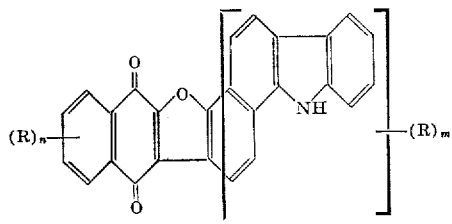

wherein R is selected from the group consisting of nitro, amino, halogen and lower alkyl, $n$ has a value of 0 to 1 and $m$ has a value of 0 to 3, to the alkali metal salts of the disulfuric acid esters of their leuco forms, and to methods for producing them.

It has been found that these compounds, in contradistinction to most other vat brown dyestuffs, produce excellent prints as well as dyeings. They dye and print in reddish-brown to violet-brown shades of good fastness to washing, chlorine and light.

The dyestuffs of this invention may be produced by reacting a 2,3-dichloro-1,4-naphthoquinone with a 3'-hydroxy-(benzo-1',2':1,2-carbazole) in the presence of an acid acceptor. This reaction may be illustrated by the following formula:

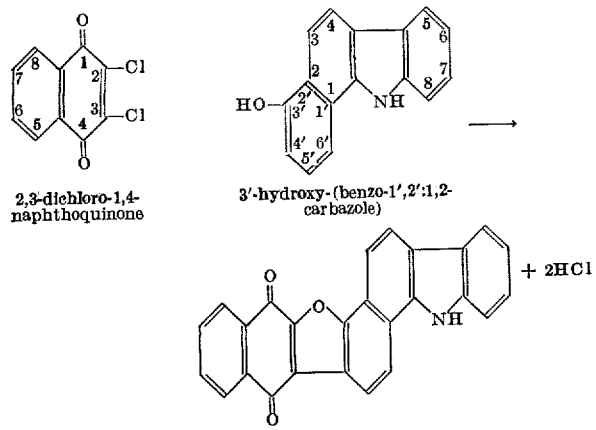

2,3-dichloro-1,4-naphthoquinone

3'-hydroxy-(benzo-1',2':1,2-carbazole)

It will be understood that in carrying out the foregoing reaction, the reactants may contain nuclear substituents which do not interfere with the desired reaction for the production of the corresponding substituted reaction products. Such substituents may, for example, be nitro, halogen, such as chlorine and bromine, lower alkyl such as methyl, ethyl, and the like. Thus, the naphthoquinone reactant may contain one such substituent in the 5, 6, 7 or 8-position, while the benzocarbazole reactant may contain up to three such substituents in the 3, 4, 5, 6, 7, 8, 5' or 6'-positions. However, it should be apparent that the 4'-position in the benzocarbazole reactant must be unsubstituted since it takes part in the ring-closing condensation reaction. Amino-substituted derivatives may be prepared readily from the corresponding nitro derivatives by reduction in well known manner.

In carrying out the reaction, the reactants are employed in about equimolar proportions although an excess of one reactant is sometimes desirable to accelerate completion of the reaction. The reaction is carried out in the presence of heat and an acid acceptor.

Preferably, the reaction is carried out in the presence of an inert organic liquid medium which is a non-solvent for the reaction product of the instant invention. In order to achieve better temperature control, a liquid medium may be employed which boils within the range of temperatures required for the reaction, which may be from about 70° to 150° C. In this manner, the reaction can be carried out under reflux. By way of example, suitable liquid media of this type include pyridine, monochlorobenzene, alcohol and the like.

The acid acceptor preferred for use in the instant invention is pyridine, since an excess thereof serves simultaneously as the liquid reaction medium. However, other basic substances may be employed as acid acceptors, such as the inorganic alkalis like potassium and sodium hydroxide and the like. In general, a sufficient amount of acid acceptor to neutralize the HCl liberated during the condensation should preferably be employed.

If desired, the vat dyestuffs of this invention may be converted into the alkali metal salts of the disulfuric acid esters of their leuco forms by the usual known methods such as by treatment with a reducing agent or metal in a pyridine-chloro-sulfonic acid solution, or by first reducing to the leuco compound and then esterifying in the normal way in an aqueous solution by the action of tertiary amine addition products of sulfur dioxide, or in any other suitable manner, followed by treatment with a suitable sodium or potassium compound to produce the desired salt.

The following examples, in which parts are by weight unless otherwise indicated are illustrative of preferred embodiments of the instant invention and are not to be regarded as limitative.

Example 1

A charge of 50 parts by volume pyridine, 4.7 parts by weight 3'-hydroxy - (benzo - 1',2':1,2 - carbazole) and 4.5 parts by weight 2,3 - dichloro - 1,4 - naphthoquinone was stirred at reflux for 3 hours. The reaction product was filtered off at room temperature, washed with pyridine, alcohol, acetone and dried. It has the apparent structure:

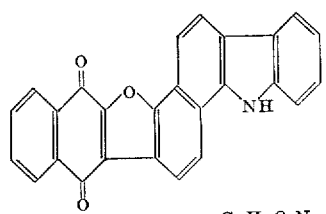

$C_{26}H_{13}O_3N$

Found: C=80.75%, H=3.44%, N=3.61%.
Theory for $C_{26}H_{13}O_3N$: C=80.61%, H=3.38%, N=3.62%.

The compound dyes cotton from an alkaline hydrosulfite vat strong reddish brown shades of good fastness to washing, chlorine and light. A print paste is prepared by ball-milling 20 parts of dyestuff with 1 part of dispersing agent such as Tamol NNO (sodium naphthalene formaldehyde sulfonate), 1 part of 20% NaOH, 3 parts of 30% anthraflavinic acid paste and 175 parts of water. The prints obtained on cotton by the usual method are strong reddish brown of the same good fastness properties as the dyeings.

Example 2

A charge of 400 parts by volume pyridine, 21.8 parts by weight 8-nitro-2,3-dichloro-1,4-naphthoquinone (prepared according to U. S. P. 1,681,599) and 18.6 parts by weight 3'-hydroxy-(benzo-1',2':1,2-carbazole) was agitated at reflux for 3 hours. After working up by the procedure described in Example 1, a nitro group containing vat dyestuff of the apparent formula:

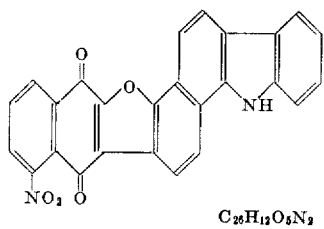

C$_{26}$H$_{12}$O$_5$N$_2$ is obtained.

The product can be dyed as is from an alkaline hydrosulfite vat which reduces the NO$_2$ group to NH$_2$. The dyeing is a deep powerful brown with a slight violet tint of good fastness properties. Similar reduction of the NO$_2$ group to NH$_2$ occurs when the product is employed in a print paste containing a conventional reducing agent such as sodium formaldehyde sulfoxylate.

Example 3

The dyestuff of Example 2 is converted from the nitro form into the amino form by the customary reduction operations, for example by heating with alkaline sodium sulfide solution or by "revatting" as follows:

27.5 parts by weight of the nitro compound C$_{26}$H$_{12}$O$_5$N$_2$ was introduced into 3440 parts by weight of 2% aqueous NaOH solution and heated to 70° C. at which temperature 55 parts by weight sodium hydrosulfite was added. Stirring was continued at 70° C. for ½ hour. Then air was blown through the leuco dyestuff solution while allowing it to cool to room temperature. The precipitated amino compound of the apparent formula

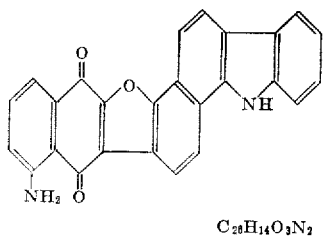

C$_{26}$H$_{14}$O$_3$N$_2$ was filtered off, washed neutral and dried. Dyeing and fastness properties were identical with the results obtained with the corresponding nitro compound.

The isolated amino compound was converted for use in a print paste by ball-milling a mixture of 2 parts by weight dyestuff C$_{26}$H$_{14}$O$_3$N$_2$ with 0.1 part by weight of Tamol NNO dispersing agent and 17.9 parts by volume water. The prints were a strong violet tinted brown of the same good fastness properties as the dyeings.

Example 4

A charge of 50 parts by volume pyridine, 4.9 parts by weight 3'-hydroxy-8-methyl-(benzo-1',2':1,2-carbazole) and 4.5 parts by weight 2,3-dichloro-1,4-naphthoquinone was agitated at reflux for 5 hours. The reaction mixture was worked up by the procedure described in Example 1. The dyestuff has the apparent formula

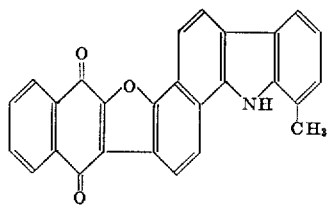

The product dyes brown shades similar to the compound of Example 1.

Example 5

A charge of 100 parts by volume pyridine, 4.9 parts by weight 3'-hydroxy-8-methyl-(benzo-1',2':1,2-carbazole) and 5.4 parts by weight 8-nitro-2,3-dichloro-1,4-naphthoquinone was agitated at reflux for 3 hours. The reaction mixture was worked up by the procedure described in Example 1 and the nitro compound reduced by the procedure described in Example 3. The dyestuff of the apparent structure:

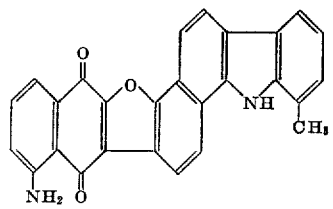

gives a very strong brown dyeing with a violet tint, more to the violet side than the dyeing with the dyestuff of Example 3 and of the same good fastness properties.

Example 6

A charge of 50 parts by volume pyridine, 5.4 parts by weight 3'-hydroxy-7-chloro-(benzo-1',2':1,2-carbazole) and 4.5 parts by weight 2,3-dichloro-1,4-naphthoquinone was agitated at reflux for 3 hours. The reaction mixture was worked up by the procedure described in Example 1. The dyestuff of the apparent formula:

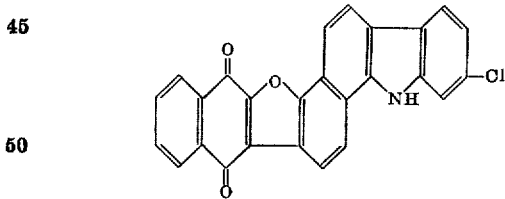

dyes brown shades similar to the compound of Example 1.

Example 7

A charge of 50 parts by volume pyridine, 5.4 parts by weight 3'-hydroxy-7-chloro-(benzo-1',2':1,2-carbazole) and 5.4 parts by weight 8-nitro-2,3-dichloro-1,4-naphthoquinone was agitated at reflux for 3 hours. The reaction mixture was worked up by the procedure described in Example 1. The resulting nitro compound can be used for dyeing or printing as is or can be reduced as described in Example 3. The dyestuff on the fiber is, in both cases, the compound of the apparent structure:

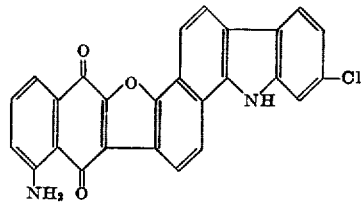

The brown dyeings have a violet tint similar to the dyeings of the product of Example 3.

Example 8

Preparation of the sulfuric acid ester alkali salt of the leuco form of the dyestuff of Example 1:

120 parts by volume of dry pyridine was cooled to keep the temperature below 60° C. while 12 parts by volume of chlorosulfonic acid was dropped into it. At 48° C. the other reaction components were charged in the following order:

12.1 parts by weight of the new brown vat dyestuff prepared as described in Example 1, 5.2 parts by weight of iron powder obtained by reduction with hydrogen, and 0.2 part by weight cuprous chloride. A stream of dry carbon dioxide was passed over the surface of the reaction mixture to exclude the air. The reaction started after a few minutes causing the temperature to rise a few degrees. When the temperature began to fall a heating bath was used to keep the charge at 53–55° C. for 4 hours while agitating. Then the reaction product was poured into a solution of 240 parts by volume water and 40 parts by weight soda ash. Water for rinsing can be used freely. The pyridine was removed by distillation under diminished pressure. After completion of the distillation the mixture was filtered, the cake being washed with hot water to remove the sulfuric acid ester sodium salt of the leuco dyestuff completely from the iron sludge. The solution including the washings was salted out at room temperature with potassium chloride. After filtration the cake was dried in vacuum at room temperature. The product represents the sulfuric acid ester alkali salt of the leuco form of the new brown vat dyestuff of the apparent formula:

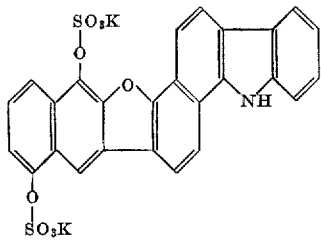

Dyeings and prints with the solution are developed with acidic oxidizing agents, such as dilute sulfuric acid and bichromate solution, to regenerate the original vat dyestuff on the fiber.

Example 9

A charge of 50 parts by volume technical alcohol (ethyl alcohol), 2.5 parts by weight potassium hydroxide flakes, 4.7 parts by weight 3'-hydroxy-(benzo-1',2':1,2-carbazole) and 4.5 parts by weight 2,3-dichloro-1,4-naphthoquinone was stirred at reflux (about 78° C.) for 3 hours. The reaction product was filtered off at room temperature, washed with alcohol, acetone, water until neutral and dried. The product is identical with the compound of Example 1.

Example 10

A charge of 25 parts by volume monochlorobenzene, 25 parts by volume pyridine, 4.7 parts by weight 3'-hydroxy-(benzo-1',2':1,2-carbazole) and 5.0 parts by weight 2,3-dichloro-1,4-naphthoquinone was stirred at reflux (121–123° C.) for 3 hours. The reaction product was filtered off at room temperature, washed with monochlorobenzene, acetone, water and dried. The product is identical with the compound of Example 1.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. A dyestuff selected from the group consisting of compounds having the formula

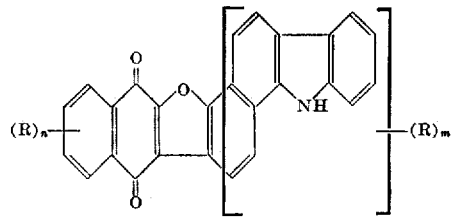

wherein R is selected from the group consisting of nitro, amino, halogen, and lower alkyl, $n$ has a value of 0 to 1, and $m$ has a value of 0 to 3, and the alkali metal salts of the disulfuric acid esters of the leuco forms of such compounds.

2. A vat dyestuff having the formula

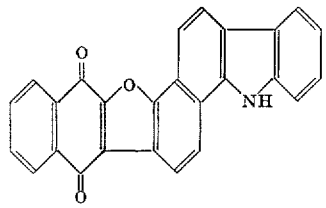

3. A vat dyestuff having the formula

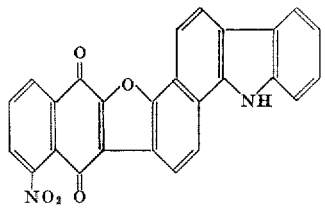

4. A vat dyestuff having the formula

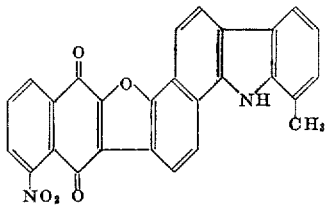

5. A vat dyestuff having the formula

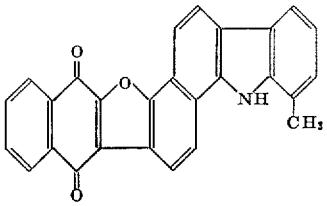

6. A vat dyestuff having the formula

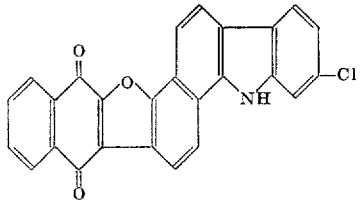

7. In a process for producing a dyestuff as defined in claim 1, the step comprising heating a 2,3-dichloro-1,4-naphthoquinone with a 3'-hydroxy-(benzo-1',2':1,2-carbazole) the 4'-position of which is unsubstituted, in the presence of an acid acceptor.

8. A process for producing a dyestuff as defined in claim 2 comprising heating 2,3-dichloro-1,4 - naphthoquinone with 3'-hydroxy-(benzo-1',2':1,2-carbazole) in the presence of an acid acceptor.

9. A process for producing a dyestuff as defined in claim 3 comprising heating 8-nitro-2,3 - dichloro - 1,4-naphthoquinone with 3'-hydroxy-(benzo-1',2':1,2-carbazole) in the presence of an acid acceptor.

10. A process for producing a dyestuff as defined in claim 4 comprising heating 8 - nitro-2,3-dichloro-1,4-naphthoquinone with 3' - hydroxy-8-methyl - (benzo-1',2':1,2-carbazole) in the presence of an acid acceptor.

11. A process for producing a dyestuff as defined in claim 5 comprising heating 2,3-dichloro-1,4-naphthoquinone with 3'-hydroxy-8-methyl-(benzo-1',2':1,2-carbazole) in the presence of an acid acceptor.

12. A process for producing a dyestuff as defined in claim 6 comprising heating 2,3-dichloro-1,4-naphthoquinone with 3'-hydroxy-7-chloro-(benzo-1',2':1,2-carbazole) in the presence of an acid acceptor.

No references cited.

UNITED STATES PATENT OFFICE
Certificate of Correction

Patent No. 2,768,172                                      October 23, 1956

Wilhelm Schmidt-Nickels

It is hereby certified that error appears in the printed specification of the above numbered patent requiring correction and that the said Letters Patent should read as corrected below.

Column 5, lines 33 to 43, inclusive, Example 8, the structural formula should read as shown below instead of as in the patent:

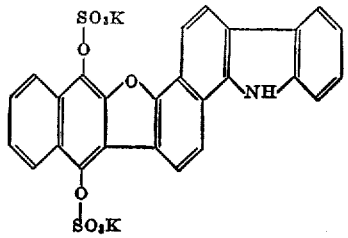

Signed and sealed this 17th day of September 1957.

[SEAL]

Attest:
KARL H. AXLINE,
*Attesting Officer.*

ROBERT C. WATSON,
*Commissioner of Patents.*